(12) United States Patent
Mayer et al.

(10) Patent No.: US 12,168,369 B2
(45) Date of Patent: Dec. 17, 2024

(54) WHEEL

(71) Applicant: Mubea Carbo Tech GmbH, Salzburg (AT)

(72) Inventors: Christoph Mayer, Graz (AT); Thomas Muhr, Attendorn (DE)

(73) Assignee: Mubea Carbo Tech GmbH, Salzburg (AT)

( * ) Notice: Subject to any disclaimer, the term of this patent is extended or adjusted under 35 U.S.C. 154(b) by 764 days.

(21) Appl. No.: 17/287,663

(22) PCT Filed: Oct. 23, 2019

(86) PCT No.: PCT/EP2019/078839
§ 371 (c)(1),
(2) Date: Apr. 22, 2021

(87) PCT Pub. No.: WO2020/083973
PCT Pub. Date: Apr. 30, 2020

(65) Prior Publication Data
US 2021/0354505 A1 Nov. 18, 2021

(30) Foreign Application Priority Data
Oct. 24, 2018 (CH) .................................... 01294/18

(51) Int. Cl.
*B60B 5/02* (2006.01)
*B60B 3/04* (2006.01)
*B60B 3/10* (2006.01)

(52) U.S. Cl.
CPC ............. *B60B 5/02* (2013.01); *B60B 3/041* (2013.01); *B60B 3/10* (2013.01);
(Continued)

(58) Field of Classification Search
CPC ....... B60B 5/02; B60B 5/005; B60B 2360/34; B60B 2360/36; B60B 2360/341;
(Continued)

(56) References Cited

U.S. PATENT DOCUMENTS 8,070,235 B2 * 12/2011 Reuteler ............... B29C 70/345
301/95.104
2013/0002006 A1   1/2013 Pruden et al.
(Continued)

FOREIGN PATENT DOCUMENTS

CH           709492 A2    10/2015
CN         105916700 A     8/2016
(Continued)

OTHER PUBLICATIONS

English translation of Search Report for JP 2021-521362 mailed May 9, 2023.
(Continued)

*Primary Examiner* — S. Joseph Morano
*Assistant Examiner* — Eva L Comino
(74) *Attorney, Agent, or Firm* — GrowIP Law Group LLC

(57) ABSTRACT

The disclosure is directed to a wheel having a rim that is at least partially made from several layers of fiber-reinforced plastic, and a wheel center having multiple spokes extending from a wheel hub, which constitutes an axis of rotation, to the rim in a radial direction. According to the disclosure the rim comprises a rim well extending in transversal direction between an inboard flange and an outboard flange suitable to receive a tire to be mounted thereon. The wheel includes a circumferential collar that extends from the outboard flange radially inwards towards the axis of rotation and that has an outboard collar face that constitutes an aerodynamic surface.

23 Claims, 8 Drawing Sheets

(52) U.S. Cl.
CPC ... *B60B 2360/341* (2013.01); *B60B 2360/362* (2013.01); *B60B 2900/111* (2013.01); *B60B 2900/1216* (2013.01); *B60B 2900/513* (2013.01)

(58) Field of Classification Search
CPC ....... B60B 2360/362; B60B 3/02; B60B 3/10; B60B 3/041; B60B 3/042; B60B 3/044; B60B 3/045; B60B 3/047; B60B 21/025; B60B 21/10; B60B 7/01
USPC .................................................. 301/95.103
See application file for complete search history.

(56) References Cited

U.S. PATENT DOCUMENTS

| | | | |
|---|---|---|---|
| 2014/0191566 A1 | 7/2014 | Burlefinger et al. | |
| 2014/0375112 A1* | 12/2014 | Werner | B60B 5/02 301/63.109 |
| 2017/0267022 A1* | 9/2017 | Anderson | B60B 1/06 |
| 2018/0022152 A1 | 1/2018 | Anderson | |

FOREIGN PATENT DOCUMENTS

| | | | |
|---|---|---|---|
| CN | 106064550 | A | 11/2016 |
| CN | 108068540 | A | 5/2018 |
| CN | 207630873 | U | 7/2018 |
| DE | 3338613 | A1 | 6/1984 |
| DE | 102012107692 | A1 | 2/2014 |
| EP | 0111177 | A2 | 6/1984 |
| EP | 3272557 | A1 | 1/2018 |
| JP | S6089417 | U | 6/1985 |
| JP | 2004322898 | A | 11/2004 |
| JP | 2010274809 | A | 12/2010 |
| JP | 2013169842 | A | 9/2013 |
| JP | 2014524387 | A | 9/2014 |
| JP | 2015505767 | A | 2/2015 |
| JP | 2016037061 | A | 3/2016 |
| TW | 201311475 | A | 3/2013 |
| WO | 2015158780 | A1 | 10/2015 |
| WO | 2016066769 | A1 | 5/2016 |

OTHER PUBLICATIONS

Microfilm of Japanese Utility Model Application No. S57-195997 A (Japanese Unexamined Utility Model Application Publication No. S59-102502 A).
English translation of Office Action issued for CN 201980069016.9 mailed Jun. 26, 2023.
English translation of Search Report for CN 201980069016.9 mailed Jun. 19, 2023.
PCT/EP2019/078839, International Search Report and Written Opinion mailed Jun. 4, 2020.

* cited by examiner

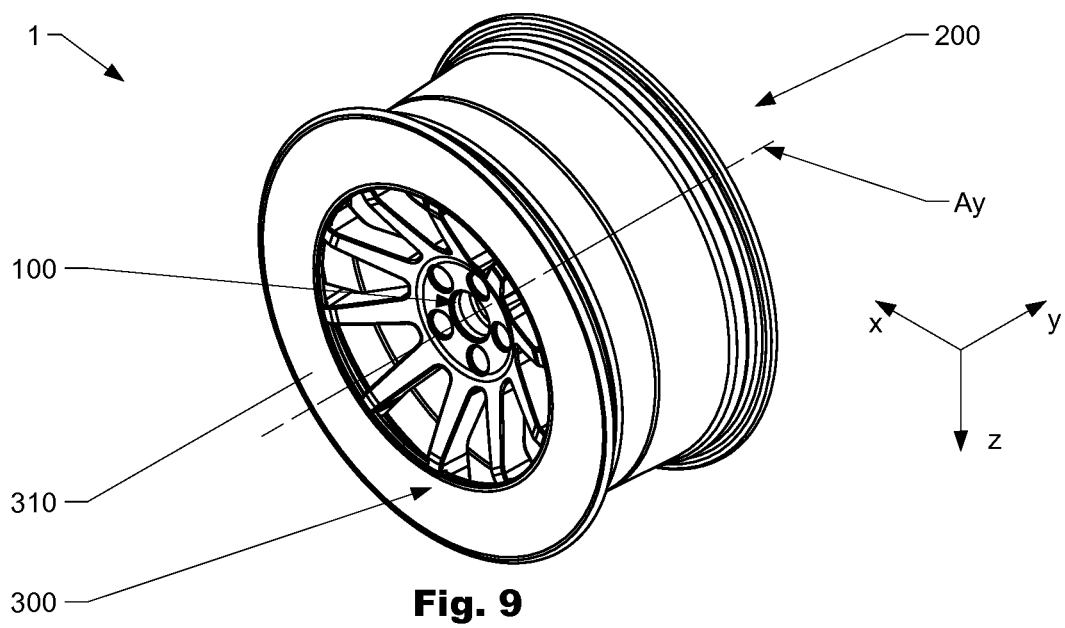
Fig. 9
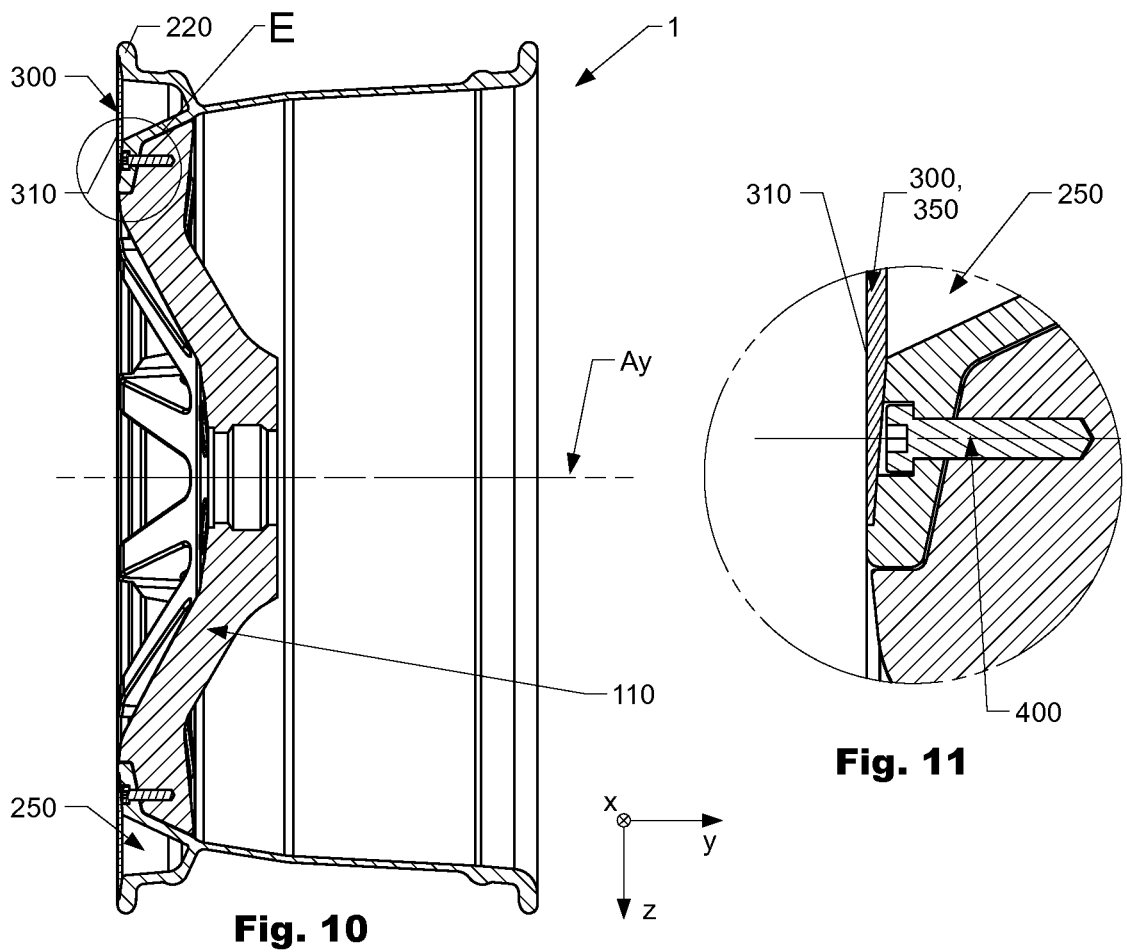
Fig. 10
Fig. 11

WHEEL

CROSS-REFERENCE TO RELATED APPLICATIONS

This application claims the benefit of the filing date of international PCT Application No. PCT/EP2019/078839, filed on Oct. 23, 2019, that in turn claims priority to Swiss Patent Application No. CH01294/18, filed on Oct. 24, 2018, the contents of which are hereby incorporated by reference in their entirety.

TECHNICAL FIELD

The present disclosure relates to a wheel with a rim that is at least partially made from several layers of fiber-reinforced plastic. The present disclosure is further directed to a fastening arrangement for a wheel to a vehicle hub.

BACKGROUND

Wheels made at least partially from fiber-reinforced plastics are known from the prior art.

US2017267022 A was published on 21 Sep. 2017 on behalf of Swift Engineering Inc. and relates to a wheel including a first hoop attached to a second hoop about a circumferential interface. The first and second hoops form at least part of an enclosed box structure positioned circumferentially around the wheel and adjacent to an outboard side of the wheel. The box structure may be formed at least in part by circumferential projections of the first hoop and the second hoop. The wheel may also include a central hub that optionally includes spokes. In some embodiments, the central hub may form part of the enclosed box structure. In some embodiments, a first hoop portion and a second hoop portion may be integral or unitary, with a box structure integrally formed between the hoop portions.

US2010320831 A was published on 23 Dec. 2010 on behalf of Su Rystar and discloses a composite rim including a metallic outer sub-rim and a carbon composite material based inner sub-rim. The outer sub-rim is an integrated structure and has an inner surface, on which the inner sub-rim is attached. Thereby, the material consumption is reduced and the mechanical strength is maintained in the meanwhile.

WO2015/027271 A1 was published on 5 Mar. 2015 on behalf of Carbon Revolution PTY Ltd and discloses a center-lock attachment arrangement attaching a composite wheel to a mount using a center-lock fastener and a center-lock fastening nut, which can be fastened on the center-lock fastener. The composite wheel includes a central attachment area that has a central attachment aperture through which the center-lock fastener is inserted. As well it includes a front element having an attachment aperture through which the center-lock fastener is inserted and a backing element including an attachment aperture though which the center-lock fastener is inserted. The document further discloses a plurality of fastener apertures that are annularly spaced around the attachment aperture of the composite wheel, the front element and the backing element. In use, a plurality of elongate fasteners configured to be received through the aligned apertures of the front element and the backing element clamp the front and the backing element over and around the central attachment area of the composite wheel.

WO2013/000009 A1 was published on 3 Jan. 2013 on behalf of Carbon Revolution PTY Ltd and discloses an attachment arrangement for use in attaching a composite wheel to a mount using elongate fastener elements and fastening nuts, which can be fastened on the elongate fastener elements. The attachment arrangement is used with a composite wheel that includes at least one attachment aperture through which the elongate fastener element is inserted. The attachment arrangement includes a fastening washer that has a fastening aperture through which the elongate fastener element can be inserted when in use. The fastening aperture includes a radially central fastening axis. The fastening washer also has a base con-figured to face a surface of the composite wheel about the attachment aperture. In addition, the fastening washer has a fastening side facing substantially axially outwardly from the attachment aperture. The fastening side includes at least one engagement surface configured to operatively engage a complementary portion of the fastening nut when the fastening nut is assembled on the elongate fastener element. The fastening arrangement also includes a sleeve which extends axially relative to the fastening axis outwardly from the base about the fastening aperture. The sleeve is configured to extend into the attachment aperture of the composite wheel. The sleeve also includes a distal end configured to be received in a complementary shaped sleeve aperture located in the mount or in an element located adjacent the mount.

SUMMARY

In order to improve the driving characteristics and/or energy consumption of a vehicle (in particular of motor vehicles, such as motorcars) different approaches regarding the vehicle's wheels can be pursued.

On the one hand, one can try to minimize the total mass of a wheel, which reducestotal inertia of the vehicle and the moment of inertia of the wheel. This has a direct influence on acceleration characteristics and the maneuverability of a vehicle. As well, when reducing the wheel's total weight, the fact can be taken into account that mass disposed away from the wheel's rotation axis contributes significantly more to the moment of inertia of the wheel than mass close to the rotation axis. Hence decreasing the weight of the rim offers higher potential for improving the performance of a wheel than decreasing the weight of the wheel center. Therefore, so called "hybrid wheels" have emerged which combine rims made from especially light materials with wheel centers made from materials that are more conventional. A typical pairing of materials used for hybrid wheels is using a fiber-reinforced plastic material (e.g. comprising glass fibers, carbon fibers, aramid fibers, basalt fibers or combinations thereof as reinforcing fibers) for the rim and a lightweight metal such as magnesium, aluminum or titanium for the wheel center. Within the context of the present disclosure, "aluminum", "magnesium" and "titanium" should be understood as meaning also their alloys. However, these types of hybrid wheels in many cases require special measures in order to prevent corrosion phenomena between the different materials as well as to prevent stress concentration (respectively to obtain an even stress and strain distribution) in the areas where the different materials (having different mechanical properties, such as Young's moduli) come together. For some applications, also wheels having both rim and wheel center made at least partially from fiber-reinforced plastics may be used. However, for these types of wheels the transition region between the rim and the wheel center often turns out to be critical in particular if the wheel center is a spider wheel (comprises spokes) and not a disc. As well, attachment of these wheels to a vehicle's hub often turns out to be critical, as the load transfer from a vehicle's hub into the wheel's hub region and from there via the surrounding region of the wheel center into the rim requires efficient load transfer into the reinforcing fibers that are arranged in the wheel center.

On the other hand, in particular reduction of energy/fuel consumption—but also improvement of the driving characteristics of a vehicle—can be obtained by modifying a wheel's aerodynamics. It turns out that for many wheels in particular the spokes are a main source of vortices, which negatively affect its aerodynamics. Nevertheless, spokes are usually necessary in order to allow ventilation and hence cooling of a brake system that is typically arranged at a vehicle's hub. Consequently, for most types of vehicles and application, spokes cannot be completely replaced by (closed) discs. However, it turns out that the aerodynamics of a spoked wheel can already be significantly improved if the generation of vortices at the centrifugal regions of the spokes can be at least reduced. One main reason for this is that in these regions the highest relative speeds between the wheel and surrounding air can be obtained because the translational movement of the vehicle with the rotational movement of the wheel are superimposed. A way to reduce the generation of vortices in the centrifugal regions of the spokes is to cover the centrifugal ends of the spokes by a panel. However, it turns out that retrofitted panels in many cases significantly increase a wheel's total weight as well, as installation of these panels is usually labor intensive, since they have to meet very high mechanical and chemical requirements. The present disclosure allows obtaining wheels that offer superior mechanical and aerodynamic properties and still can be produced in a cost-efficient way.

In order to solve at least one of the aforementioned problems, a wheel according to the disclosure typically comprises a rim that is at least partially made from several layers of fiber-reinforced plastic as well as it has a wheel center that comprises multiple spokes which extend from a wheel hub, which constitutes an axis of rotation, to the rim in a radial (centrifugal) direction. According to the disclosure, the rim comprises a rim well that extends in transversal direction between an inboard flange and an outboard flange and is suitable to receive a tire to be mounted thereon. A wheel according to the invention typically also comprises a circumferential collar (skirt) that extends from the outboard flange radially inwards towards the axis of rotation and that has an outboard collar face that constitutes an aerodynamic surface. Hence, the circumferential collar has an effect on the aerodynamic properties of the wheel.

Good results may be obtained if the circumferential collar is configured and arranged to transfer load from the rim to the wheel center, as will be shown in more detail below.

For some types of wheels, the circumferential collar may be essentially annulus-shaped and have an inner radius and an outer radius (distances from the centripetal and centrifugal boundaries of the collar to the axis of rotation of the wheel). According to one variation of the disclosure, the minimum distance from the axis of rotation of the wheel to the centripetal side of the rim well is greater than the inner radius. Such a variation has particularly good aerodynamic properties.

According to one variation of the disclosure, the minimum distance from the axis of rotation of the wheel to the centripetal side of the outboard rim shoulder may be greater than the inner radius. Such a variation of the disclosure may be advantageous with respect to cooling of a brake system interconnected to the wheel (e.g. a disk brake).

A variation of a wheel that offers for many applications a good trade-off between good aerodynamics during driving, ventilation for cooling of a brake system and mechanical competence may be obtained if the ratio between the outer radius and the inner radius is between 1.2 and 1.8, in particular if the ratio is about 1.5 as will be shown in more detail below.

According to a variation of the disclosure, the outboard collar face of the circumferential collar is essentially flat (two-dimensional, planar). Hence, it may define a plane.

However, such an essentially flat outboard collar face may also comprise chamfers and/or roundings/fillets at its boundary areas, e.g. to merge into the outboard flange and/or a spoke structure. According to one variation of the disclosure, the outboard collar face of the circumferential collar may essentially have the shape of a conical frustum (respectively the shell of a conical frustum). Such a variation may be advantageous for certain types of vehicles. Good results may be obtained if the conical frustum has an opening angle of between about 170° and 185°.

A variation of a wheel that has a particularly high mechanical competence may be obtained if at least part of the circumferential collar is an integral part of the rim. Hence, the rim and circumferential collar may be formed as a one-piece structure. Alternatively or in addition, at least part of the circumferential collar may also be part of the wheel center, as will be shown in more detail below.

A particularly lightweight and mechanical competent wheel may be obtained if the circumferential collar comprises at least one layer of a fiber-reinforced plastic. According to a variation of the disclosure, in a sectional view of the wheel a first layer of reinforcing fibers may emerge from the centrifugal side of the rim (respectively start at the centrifugal side of the rim) and extend via the outboard flange into the circumferential collar. A variation of a wheel according to the present disclosure which has a good mechanical competence and can be relatively easily manufactured may be obtained if the first layer of reinforcing fibers starts at the outboard rim shoulder and extends via the outboard flange into the circumferential collar. A mechanically particularly competent variation of a wheel may be obtained if the first layer of reinforcing fibers starts at the rim well and extends via an outboard rim shoulder and via the outboard flange into the circumferential collar. The layer of reinforcing fibers may e.g. be a textile like a woven fabric or multiaxial fabric (e.g. a triaxial fabric). Good results may also be obtained using non-crimp fabrics (NCF) and/or layers made by tailored fiber placement (TFP). It is clear that a wheel according to the present disclosure may also comprise multiple layers of reinforcing fibers like the first layer of reinforcing fibers (as well as second layers and higher-order layers) as described herein. Particularly good results may be obtained if a first layer of reinforcing fibers at least partially surrounds a circumferential cavity as subsequently described herein and may even form at least part of a bulkhead as subsequently described herein. In a variation of a wheel according to the disclosure in which the wheel center is at least partially made from a fiber reinforced plastic, the first layer of reinforcing fibers may extend in centripetal direction radially inwards to the axis of rotation and form at least part of the wheel center, e.g. at least part of the spokes.

According to a variation of the disclosure, a mechanically highly competent circumferential collar can be obtained if, in a sectional view of the wheel, a second layer of reinforcing fibers emerges from the centripetal side of the rim and extends (in outboard direction) into the circumferential collar.

According to a variation of the disclosure, in a sectional view of the wheel, a third layer of reinforcing fibers emerges from the centrifugal side of the rim and extends via the inboard flange and via the centripetal side of the rim into the circumferential collar. A mechanically particularly competent wheel may be obtained if the third layer of reinforcing fibers thereby at least partially surrounds a circumferential cavity as described herein. According to a variation, the third layer of reinforcing fibers extends from the circumferential collar via the outboard flange to the outboard rim shoulder. Particularly good results may be obtained if the third layer of reinforcing fibers extends via the outboard rim shoulder into the rim well. According to a variation of the disclosure the third layer of reinforcing fibers starts at the rim well and/or ends at the rim well.

Depending on the application, the rim may comprise at least one bundle of unidirectional fibers that is arranged in circumferential direction at the outboard and/or inboard flange (the fibers being aligned essentially in circumferential direction of the wheel). The first and/or the second layer and/or third layer of fibers may at least partially surround the bundle of fibers, respectively form a loop around the at least one bundle of fibers. Thus, a mechanically particularly competent wheel (with respect to strength, stiffness and failure tolerance) may be obtained.

According to a variation of the disclosure, the wheel center is at least partially made from several layers of a fiber-reinforced plastic. According to a variation of the disclosure, a fourth layer of reinforcing fibers emerges at a spoke and extends into the circumferential collar. A wheel having a particularly good mechanical performance may be obtained if the fourth layer of reinforcing fibers extends via an outboard spoke face and via the circumferential collar and via the outboard flange to the out-board rim shoulder. According to one variation of the disclosure, the fourth layer of reinforcing fibers extends via the outboard rim shoulder into the rim well.

Depending on the outer geometry of the wheel, the mechanical competence of a wheel according to the present disclosure may also be increased if, in a sectional view of the wheel, a fifth layer of reinforcing fibers emerges from the centripetal side of the rim (in particular the rim well) and extends into at least one spoke at an inboard spoke face. According to one variation of the disclosure, in a sectional view of the wheel, a sixth layer of reinforcing fibers emerges from an inboard spoke face and extends via the centripetal side of the rim (in particular the centripetal side of the outboard rim shoulder) to the circumferential collar. Thus, a particularly good load transfer between the inboard region of the rim and the wheel center can be obtained. According to one variation of the disclosure, the sixth layer further extends via the circumferential collar into an outboard spoke face.

According to a variation of the disclosure, the rim and at least part of the wheel center are formed as a one-piece structure, respectively are integrally made. Thus, the mechanical competence of the interconnection between the rim and the wheel center can be significantly increased as well, as the production of a wheel can be simplified.

For some applications, the wheel center may be at least partially made from a metal. Such types of wheels are also referred to as hybrid wheels. In particular lightweight metals may be used for the wheel center, including magnesium, aluminum, titanium. However, for some applications at least some parts may also be made from steel. In a variation of the disclosure, the spokes and/or the hub are at least partially made from a metal. In a variation of a wheel comprising a wheel center made at least partially from a metal, the wheel center may comprise a circumferential ring that interconnects the centrifugal ends of the spokes with each other. Good results may be obtained if the circumferential ring is mechanically interconnected with a connecting face arranged at the centripetal side of the rim. In a variation of the invention, the circumferential ring is mechanically interconnected with a connecting face arranged at the inboard side of the circumferential collar. In a variation of such an embodiment of a wheel according to the disclosure, the circumferential ring forms at least part of the circumferential collar as will be shown in more detail in the subsequent figures.

According to a variation of a wheel according to the present disclosure, the wheel center and the rim are mechanically interconnected by at least one fastening means, preferably by an elongate fastening means, like a screw or a bolt. Alternatively or in addition, the rim and the wheel center may also be interconnected using an adhesive. According to a variation of the disclosure, at least one layer may be arranged between wheel center and the rim, such as described in the international patent application published as WO2016/066769A1.

According to a variation of the disclosure, at least one fastening means extends from a spoke to the circumferential collar. Good results may be obtained if the at least one fastening means extends from a centrifugal end of the spokes. The end of the fastening means may be arranged at the circumferential collar and may be covered by a cover means, which is particularly advantageous if the fastening means comprises a screw. Thus, interference between the fastening means and a tire during installation of a tire can be minimized. In a variation of the disclosure, the fastening means comprises a screw having a longitudinal axis that is essentially perpendicular to the outboard collar face. If the outboard collar face has an essentially frusto-conical shape, the longitudinal axis of an elongated fastening means may be essentially in parallel to the axis of rotation of the wheel. According to one variation of the disclosure, at least one fastening means extends from a spoke through the rim at the region between the outer hump and the rim well. Thus, a particularly advantageous stress distribution in the rim can be obtained.

In order to increase the mechanical competence of the wheel and/or increase its aerodynamic properties, according to a variation of the disclosure a cover means may extend from the outboard flange towards the axis of rotation forming at least part of the outboard collar face of the collar. According to a variation of the disclosure, the cover means is arranged and configured such that from the outboard flange a force can be applied to the cover means and transferred via the cover means to the wheel center, such as to a spoke of the wheel center, as will be explained in more detail below. Good results may be obtained if the cover means is at least partially made from a fiber-reinforced plastic and comprises at least one layer of reinforcing fibers. In particular, if in a mounted state at least a portion of the reinforcing fibers are arranged in radial direction of the wheel. The cover may be permanently or detachably interconnected with the wheel center and/or the rim. It may be interconnected by means of an adhesive and/or by clamping. At least one sealing means may be arranged between the cover and the rim and/or wheel center. Good results may be obtained if an adhesive is used as a sealing means. A detachable mounting may be advantageous in order to replace the cover in case of damage (scratches). In a variation of the disclosure, the cover means constitutes at least part of the aerodynamic surface. Therefore, according to a variation of the disclosure, the cover may comprise an outboard surface, which has an aerodynamically active texture. As such, it e.g. may comprise dimples etc. According to a variation of the disclosure, the cover means may also cover at least one fastening means that mechanically interconnects the wheel center with the rim, as will be shown in more detail below.

According to a variation of the disclosure that has a particularly high mechanical competence, the cover means is arranged to transfer at least part of a load applied at the out-board rim shoulder to the spokes, e.g. via the outboard flange.

A wheel that has a particularly low weight and high mechanical competence can be obtained with a variation of the present disclosure according to which the wheel, preferably the rim, comprises a circumferential cavity arranged adjacent to the circumferential collar. Particularly good results may be obtained if at least one layer of braided fibers is arranged at least partially around the circumferential cavity. Particularly good results may be obtained if at least a portion of the circumferential cavity is at least partially—preferably fully—surrounded by a braided sleeve of reinforcing fibers.

A mechanically and aerodynamically advantageous wheel that has a particularly low total weight and low moment of inertia may be obtained with a variation of the disclosure according to which the circumferential collar constitutes a wall of a circumferential cavity as described herein.

According to a variation of the disclosure which allows a particularly light-weight wheel to be obtained, the circumferential cavity is essentially hollow (void). Such a variation of the disclosure may e.g. be obtained using a melting core (e.g. a wax core) or an inflatable core (bladder) that is at least partially removed from the circumferential cavity after at least partial hardening of the fiber-reinforced plastic.

Alternatively or in addition, the circumferential cavity may at least be partially filled with a core structure. As such, essentially the whole circumferential cavity may be filled with a lost core. Alternatively, at least some sections/segments e.g. in circumferential direction may be at least partially filled with a core structure that may assist during production of the wheel. A core structure that stays within the cavity may be e.g. made from a foam.

According to a variation of the disclosure, the circumferential cavity is a continuous cavity. According to one variation of the disclosure, the circumferential cavity comprises at least one separation wall that delimits the circumferential cavity in the circumferential direction. The circumferential cavity may also comprise multiple separation walls. For some applications, the separation walls may be arranged in the regions of the centrifugal ends of the spokes of the wheel center. Thus, an efficient load transfer between the rim and the spokes can be obtained. However, according to another variation of the invention the separation walls may be arranged in the regions between two centrifugal ends of the spokes of the wheel center. Thus, a particularly even load transfer between the wheel center and the rim can be obtained for certain types of wheel.

In a variation of the disclosure, at least one spoke comprises a spoke cavity that extends in radial direction from the wheel hub to the rim. Hence, a particularly light-weight and/or mechanically advantageous wheel can be obtained. This in particular holds true if the wheel center is at least partially made from a fiber-reinforced plastic. In a variation of the disclosure, the spoke cavity is separated from a circumferential cavity of the wheel by means of a bulkhead, as will be shown in more detail with respect to the subsequent figures. According to one variation of the disclosure, at the centrifugal end of the spoke, the spoke cavity merges into the circumferential cavity of the wheel. Hence, a particularly lightweight wheel can be obtained.

According to one variation of the present disclosure, the spokes comprise outboard spoke faces as well as at the centrifugal ends of the spokes the particular outboard spoke faces merge into the outboard collar face. Such a variation of the disclosure having geometrically smooth transition areas allows a particularly good transfer of load between the rim and the wheel center to be obtained.

The present disclosure is also directed to providing a fastening arrangement for a wheel having a wheel center made at least partially from a fiber-reinforced plastic and which is particularly advantageous when being used in combination with a wheel according to the disclosure described herein. However, the inventive concept of such a fastening arrangement as subsequently described is viewed as an independent inventive concept. This concept can thus be used e.g. independently of the disclosed wheel having a circumferential collar.

According to said inventive concept, a fastening arrangement for use in fastening at least one wheel with a wheel center made at least partially from a fiber-reinforced plastic to a vehicle hub by means of at least one elongate fastener means is provided, wherein the wheel center comprises at least one fastening aperture having at least one inner engagement surface and a fastening axis. The fastening arrangement comprises at least one bushing arrangement having at least one inner bushing opening through which the at least one elongate fastener is inserted for fastening of the wheel. The bushing arrangement is configured to extend along the fastening axis into the fastening aperture for fastening of the wheel. As well, the bushing arrangement comprises at least one outer engagement surface that is configured to face the at least one inner engagement surface when the bushing arrangement is arranged in the fastening aperture. According to the disclosure the at least one outer engagement surface is configured to apply/exert an expanding force on the inner engagement surface when the bushing arrangement is inserted into the fastening aperture, thereby widening at least a portion of the fastening aperture. Hence, by widening of the fastening aperture at least a part of the region of the center wheel adjacent to the fastening aperture is elastically and/or plastically deformed, which allows an advantageous stress and/or strain distribution to be obtained in certain reinforcing fibers arranged in this region, as will be explained in more detail below. Alternatively or in addition to the concepts for widening of the fastening aperture subsequently described, also a cold shrink fitting may be used in order to obtain such widening.

According to a variation of the disclosure the at least one outer engagement surface of the bushing arrangement has an essentially frusto-conical shape having an outer opening angle of between 5° and 20° (degree of arc). With such an outer engagement surface a particularly even widening of the fastening aperture in a transversal direction to the fastening direction can be obtained, without implementing too much deformation in direction of the fastening axis. Particularly good results may be obtained if an outer opening angle of about 10° (degree of arc) is used.

According to a variation of the disclosure, the at least one inner engagement surface of the fastening aperture has an essentially frusto-conical shape having an inner opening angle that is essentially equal to the outer opening angle. However, depending on the application, the inner opening angle may also deviate from the outer opening angle, such as e.g. by plus or minus 5° (degree of arc). Thus, a non-even widening of the fastening aperture along the fastening axis can be obtained.

According to a variation of the disclosure, the bushing arrangement comprises a first and a second bushing, the first and the second bushing being configured to be inserted into the fastening aperture from different sides respectively, as will be shown in more details in the subsequent figures. Thus, a more even deformation of the wheel can be obtained, respectively large deformation in direction of the fastening axis can be prevented. In a variation of the disclosure the first bushing comprises a first outer engagement surface that is configured to apply a first expanding force on a first inner engagement portion of the fastening aperture (720). Alternatively or in addition, the second bushing comprises a second outer engagement surface configured to apply a second expanding force on a second inner engagement surface of the fastening aperture. Within this context, the first or the second bushing may also have a cylindrically-shaped outer surface which does not apply any expanding force on an inner engagement portion of the fastening aperture. In a variation of the disclosure, the first outer engagement surface of the first bushing has an essentially frusto-conical shape having a first outer opening angle of between 5° and 20° (degrees of arc). In such a variation, the first inner engagement surface of the fastening aperture has an essentially frusto-conical shape having a first inner opening angle ($Wi1$) that is essentially equal to the first outer opening angle. Particularly good results may be obtained if the first outer opening angle is about 10°. In a variation of the disclosure the second outer engagement surface of the second bushing has an essentially frusto-conical shape having a second outer opening angle of between 5° and 20°. In such a variation, the second inner engagement surface of the fastening aperture has an essentially frusto-conical shape having a second inner opening angle that is essentially equal to the second outer opening angle. Particularly good results may be obtained if the second outer opening angle is about 10°. Depending on the type of wheel, the first and the second outer opening angles may be equal or may be different angles.

Alternatively or in addition to a frusto-conical shape, an outer engagement surface and/or an inner engagement surface may have a curved profile, respectively the outer bushing diameter and/or the fastening opening along the fastening axis may change along the fastening axis in a non-linear way. Although if compared to a frusto-conical bushing and/or frusto-conical fastening opening such a variation will typically be more complicated to be manufactured, such (two-dimensionally) curved engagement surfaces will allow a highly specific widening of the fastening aperture to be obtained and hence also stress/strain distribution in the surrounding wheel center.

According to a variation of the disclosure, the bushing arrangement comprises at least one rotation locking means that prevents rotations of at least part of the bushing arrangement about the fastening axis relatively to the surrounding wheel. Thus, reliable fastening of a wheel bolt can be obtained. According to a variation of the disclosure, the at least one rotation locking means is obtained by at least a portion of the bushing arrangement having a non-circular cross-section normal to the fastening axis such that a form fit between that bushing arrangement and the sur-rounding wheel can be obtained. According to a variation of the disclosure, at least a portion of the bushing arrangement may have a cross section that has an (outer) shape, which is essentially elliptical or polygonal.

In order to improve alignment of a first and a second bushing relatively to each other as well as to prevent unwanted stress concentration in the bushing arrangement as well as the wheel, the first bushing may comprise a first front face to be arranged in a mounted state within the fastening aperture and which has a convex shape and wherein the second bushing comprises a second front face to be arranged in a mounted state within the fastening aperture and which has a concave shape arranged to receive the first front face, as subsequently will be shown in more detail with respect to the figures. Thus, the first and the second bushing can be aligned with each other. In a variation of the disclosure, the front faces may have (frusto-) conical shapes. It is clear that alternatively, the first front face may have a concave shape and the second front face may have a corresponding convex shape. For some applications, the first and the second bushing may be mechanically interconnected with each other by an adhesive or a threaded connection; for other applications, the two bushings may be releasable from each other.

According to a variation of the disclosure, the bushing arrangement may comprise a first bushing flange to face an outboard surface of the wheel center about the fastening opening. Thus, a mechanically particularly advantageous load transfer between a fastening means and the wheel can be obtained. As well, the stress/strain distribution inside of the wheel adjacent to the fastening opening can be improved, as will be explained in more detail below. Good results may be obtained if the first bushing flange is arranged at a first bushing as described herein. Alternatively or in addition, the bushing arrangement may comprise a second bushing flange to face an inboard surface of the wheel center about the fastening opening. Thus, a particularly good interconnection with a vehicle hub can be obtained, as well as the stress/strain distribution inside of the wheel adjacent to the fastening opening can be improved. Good results may be obtained if the second bushing flange is arranged at a second bushing as described herein. Particularly good results may be obtained if a first bushing flange and the first bushing and/or a second bushing flange and the second bushing are one-piece structures, respectively integrally made.

A variation of the disclosure which allows a particularly advantageous stress/strain distribution to be obtained in the wheel center adjacent to the fastening opening if the first and/or the second bushing flange are configured such that they restrict transversal expansion (in direction of the fastening axis) of the wheel center about the fastening aperture when the fastening aperture is widened. Thus, a particularly good pre-tensioning of reinforcing fibers in the wheel adjacent to the fastening opening can be obtained.

According to a variation of the disclosure, the wheel center comprises at least one bundle of fibers that forms a loop about the at least one fastening aperture and about the fastening axis. The bundle of fibers may e.g. be or be part of a roving or a tape or a fabric or a braided structure. Depending on the type of wheel, the bundle of fibers may loop around the fastening opening for less or for more than 360° (degrees of arc), as will be shown in more detail below. Particularly good pre-tensioning of the fibers can be obtained if at least some of the fibers of the bundle of fibers are arranged at a distance of less than 5 mm (millimeters), preferably less than 2 mm from the at least one inner engagement surface. For some application at least some fibers of the at least one bundle of fibers may be aligned directly at the inner engagement surface. According to a variation of the disclosure, an auxiliary bushing may be arranged in the wheel hub at the location of the fastening apertures. Such an auxiliary bushing may assist in aligning the at least one bundle of reinforcing fibers during production, as well as it may have at least one inner engagement surface to engage with an outer engagement surface of a bushing arrangement as described herein. Thus, fibers of a bundle of reinforcing fibers can be pre-tensioned in a particularly controlled manner.

For some types of a wheel, a first and a second end portion of the at least one bundle of fibers extend in centrifugal direction of the wheel towards the rim of the wheel. In a variation, the first and the second end portions may extend in different spokes of the wheel towards the rim of the wheel. Alternatively or in addition, they may extend in the same spoke of the wheel towards the rim of the wheel.

A mechanically particularly advantageous wheel may be obtained if the first and the second end portions extend to the rim via a circumferential collar as described herein.

The present disclosure is also directed to providing a wheel with a wheel center made at least partially from a fiber-reinforced plastic and comprising a fastening arrangement as described herein.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings, which should not be considered limiting to the invention described in the appended claims. The drawings schematically show:

FIG. 9 a further variation of a wheel according to the present disclosure in a perspective view from above;

FIG. 10 a cross-section of the wheel of FIG. 9;

FIG. 11 detail E of FIG. 10;

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be understood as limited to the embodiments set forth herein; rather, these embodiments are provided so that this disclosure will satisfy applicable legal requirements. Whenever possible, like reference numbers will be used to refer to like components or parts.

Figure 1:
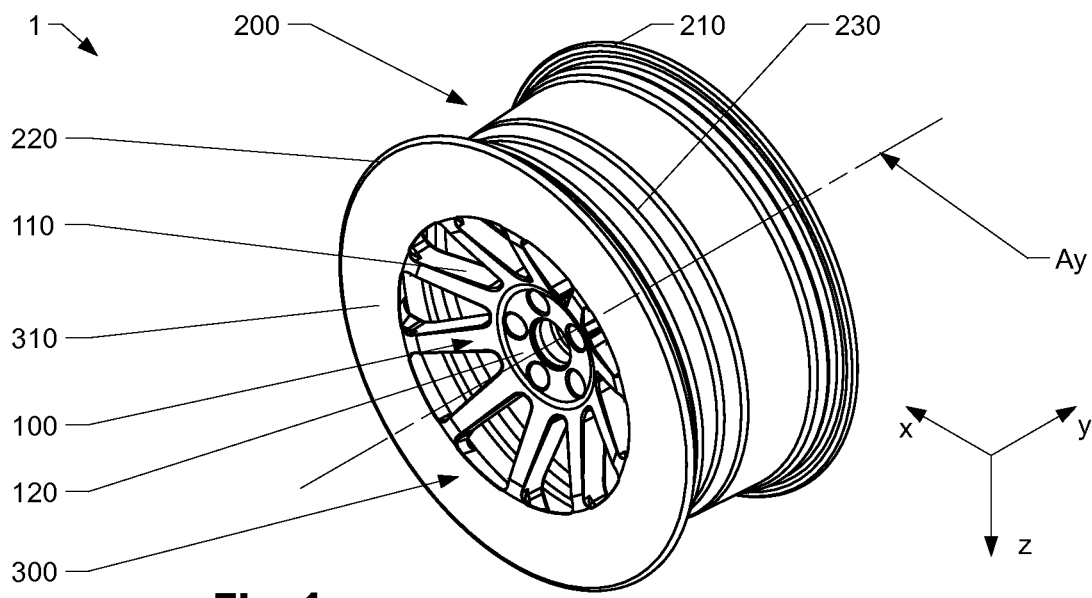
FIG. 1 a variation of a wheel according to the present disclosure in a perspective view from above.
Figure 2:
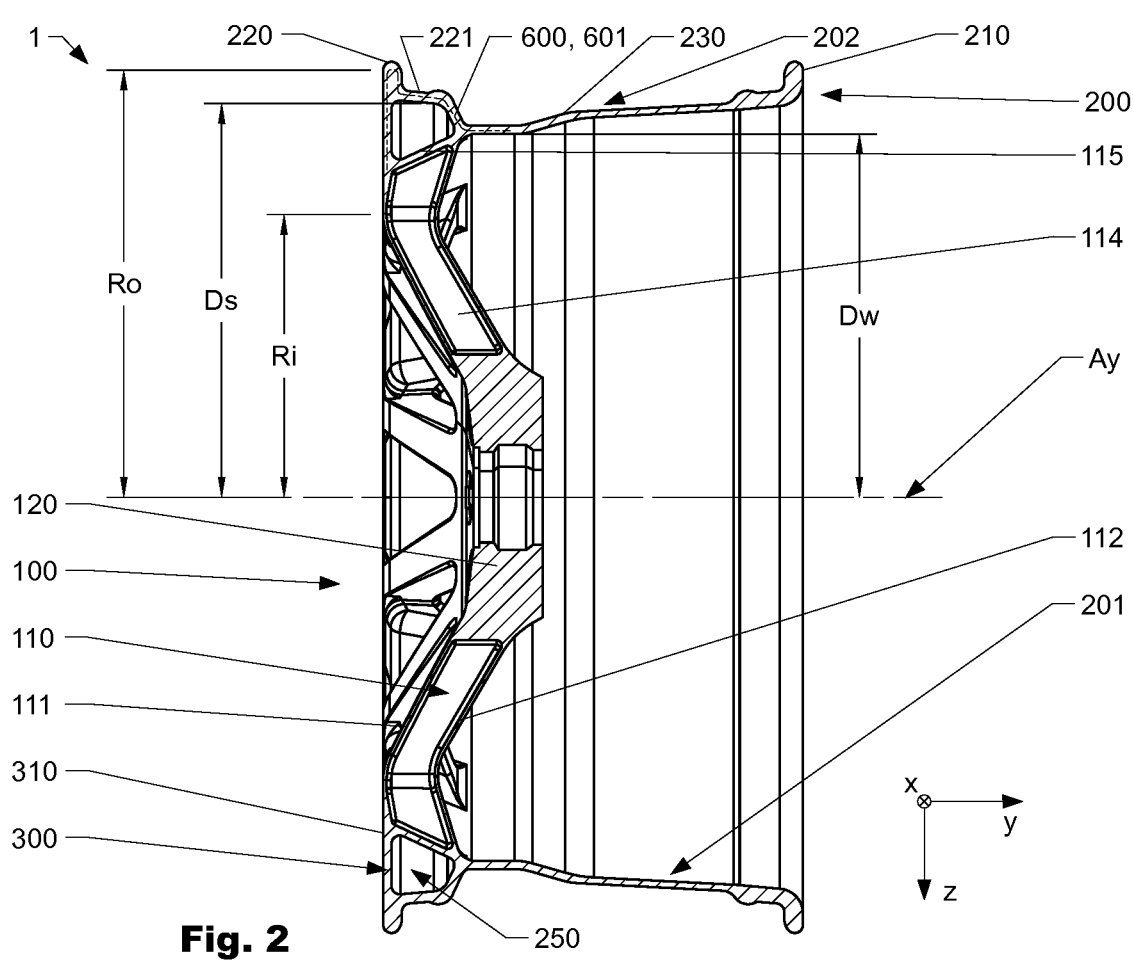
FIG. 2 a cross-section of the wheel of FIG. 1.

FIGS. 1 and 2 show a variation of a wheel 1 according to the present disclosure, which is made as a one-piece structure from a carbon-fiber reinforced plastic. The wheel comprises a rim 200 and a wheel center 100 that are both made from several layers of fiber-reinforced plastic. The wheel center comprises multiple spokes 110 extending from a wheel hub 120, which constitutes an axis of rotation Ay, to the rim 200 in a radial direction. The rim 200 has a rim well 230 extending in transversal direction y between an inboard flange 210 and an outboard flange 220 suitable to receive a tire (not shown) to be mounted thereon. The variation of a wheel 1 shown further comprises a circumferential collar 300 that extends from the outboard flange 220 radially inwards towards the axis of rotation Ay and that has an essentially flat outboard collar face 310 that constitutes an aerodynamic surface. The circumferential collar 300 of the variation of a wheel 1 shown is essentially annulus-shaped and has an inner radius Ri and an outer radius Ro. As depicted in FIG. 2, the minimum distance Dw from the axis of rotation Ay to the centripetal side 201 of the rim well 230 is greater than the inner radius Ri. As well, the mini-mum distance Ds from the axis of rotation Ay to the centripetal side 201 of the outboard rim shoulder 221 is greater than the inner radius Ri. In addition, in the variation of a wheel 1 according to the present disclosure shown in FIGS. 1 and 2, the ratio between the outer radius Ro and the inner radius Riis about 1.5. Such a ratio allows obtaining particularly high mechanical competence as well as good aerodynamic properties, while still allowing good ventilation of a vehicle's brake system that may be arranged close to the wheel 1.

In the variation shown in FIGS. 1 and 2, the circumferential collar 300 is essentially an integral part of the rim 200 as well as of the spokes 110. As schematically indicated with the dotted line, the wheel further comprises a first layer of reinforcing fibers 600, 601 that emerges from the centrifugal side 202 of the rim well 230 and extends via the outboard rim shoulder 221 and via the outboard flange 220 into the circumferential collar 300. Thus, a particularly good transfer of load between the rim 200 and the wheel center 100 can be obtained. As well, the variation of the wheel 1 shown has a second layer of reinforcing fibers (not shown) that emerges from the centripetal side 201 of the rim 200 and also extends into the circumferential collar 300. In addition, the variation of a wheel 1 according to the invention as shown in FIGS. 1 and 2 comprises a fourth layer of reinforcing fibers (not shown) that emerges at a spoke 110 and extends into the circumferential collar 300 as well as it comprises a fifth layer of reinforcing fibers (also not shown in detail) that emerges from the centripetal side 201 of the rim 200 and extends into at least one spoke 110 at an inboard spoke face 112. As shown in FIG. 2 the wheel 1 further comprises a circumferential cavity 250 that is arranged adjacent to the circumferential collar 300. The circumferential cavity 250 of the variation shown is hollow and was produced using an inflatable core structure that was re-moved after curing of the fiber-reinforced plastic. However, this variation of a wheel is not limited to being produced by such types of cores and other types of cores may be used as described herein. This circumferential cavity 250 increases the structural competence of the wheel 1 without significantly increasing its total weight. As can also be seen in FIG. 2, the spokes 110 comprise spoke cavities 114 that extend in radial direction from the wheel hub 120 to the rim 200. In the variation shown, the spoke cavities 114 are separated from a circumferential cavity 250 by means of bulkheads 115.

Figure 3:
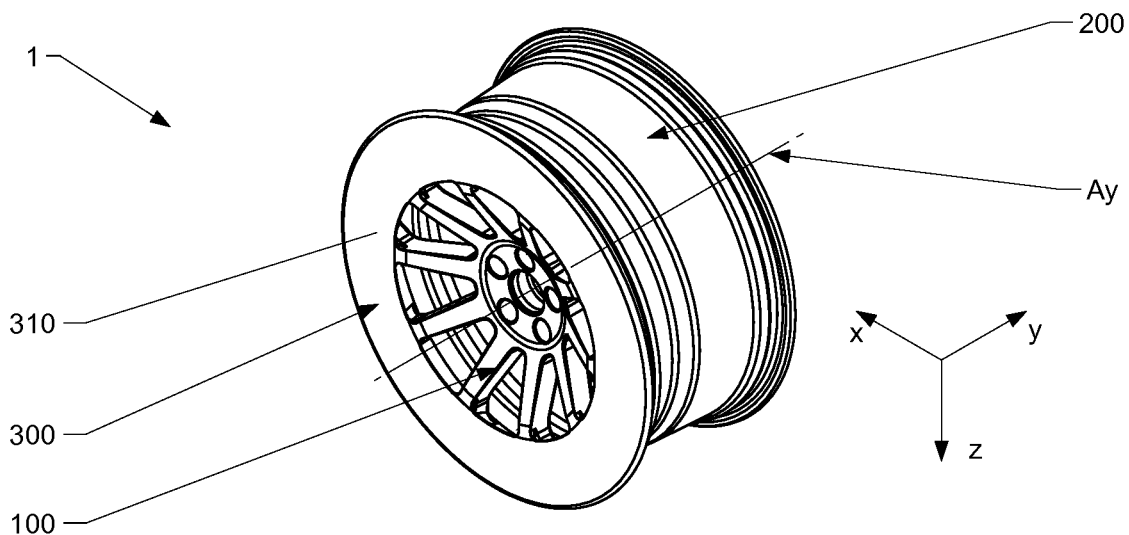
FIG. 3 a further variation of a wheel according to the present disclosure in a perspective view from above.
Figure 4:
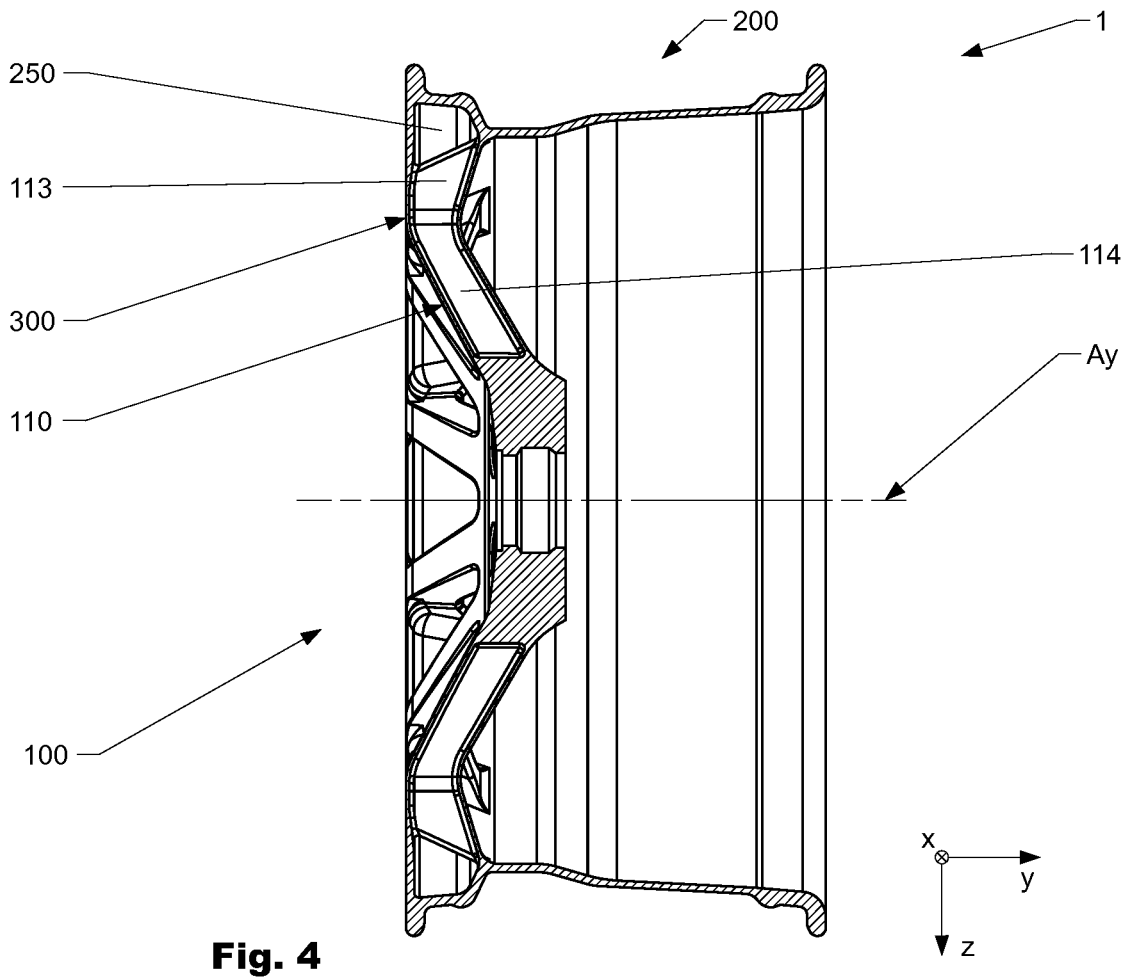
FIG. 4 a cross-section of the wheel of FIG. 3.

However, in other variations of a wheel 1, as depicted in FIGS. 3 and 4, at the centrifugal ends 113 of the spokes 110, the spoke cavities 114 may also merge into the circumferential cavity 250 of the wheel 1.

Figure 5:
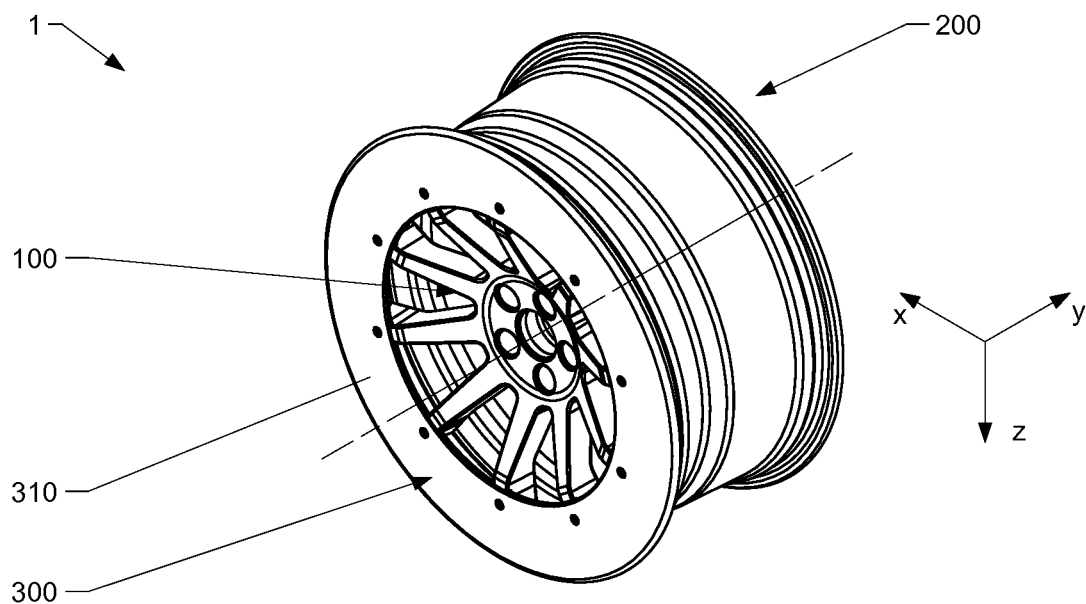
FIG. 5 a further variation of a wheel according to the present disclosure in a perspective view from above.
Figure 6:
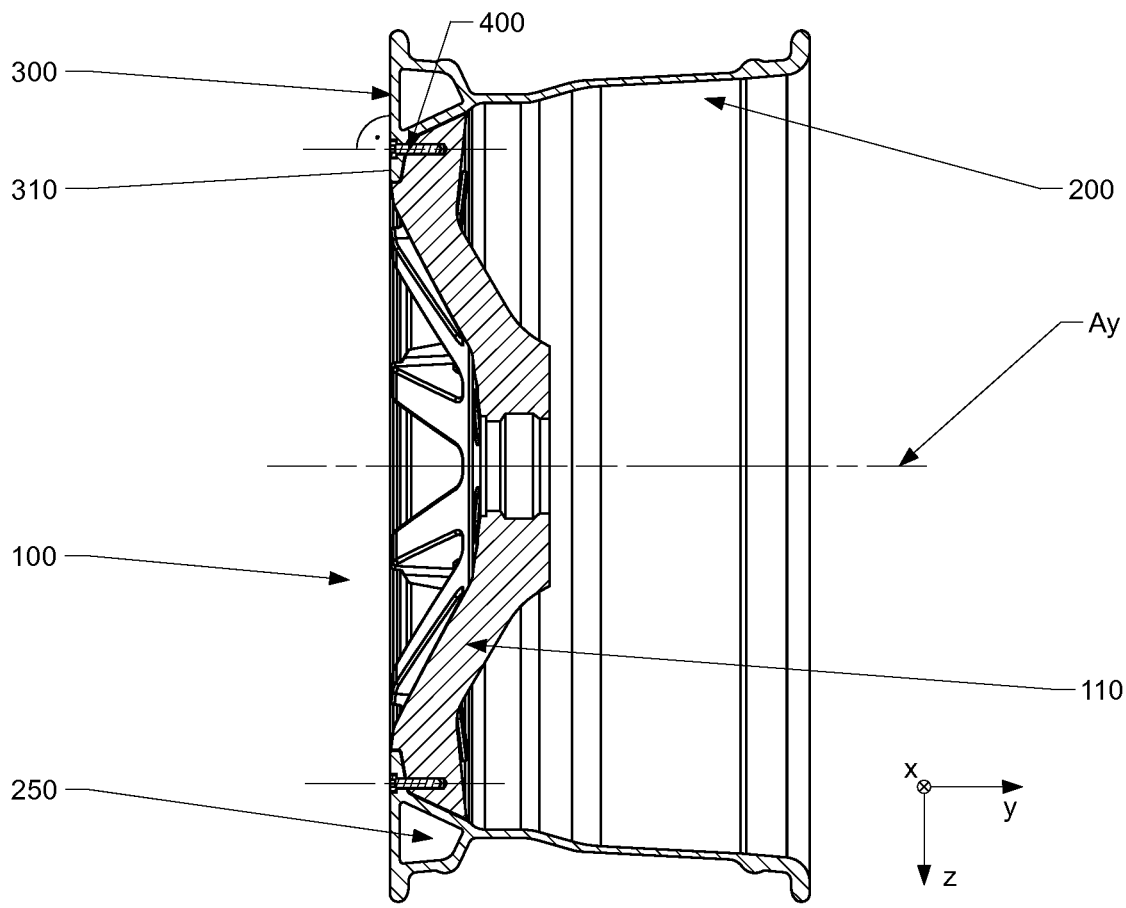
FIG. 6 a cross-section of the wheel of FIG. 5.

FIGS. 5 and 6 show a hybrid-type variation of a wheel 1 according to the present disclosure, which has a wheel center 100 made from aluminum, having spokes 110 that are also made from aluminum. It is clear that such a variation of a wheel is not limited to aluminum and hence other metals may be used as described herein. As schematically shown, the wheel center 100 and the rim 200 are mechanically interconnected by screws that serve as fastening means 400. Therefore, the screws 400 extend from the spokes 110 to the circumferential collar 300, their longitudinal axes being essentially perpendicular to the outboard collar face 310. As also shown, the variation of a wheel 1 shown again comprises a circumferential cavity 250 that is part of the rim 200 made by a fiber-reinforced plastic.

Figure 7:
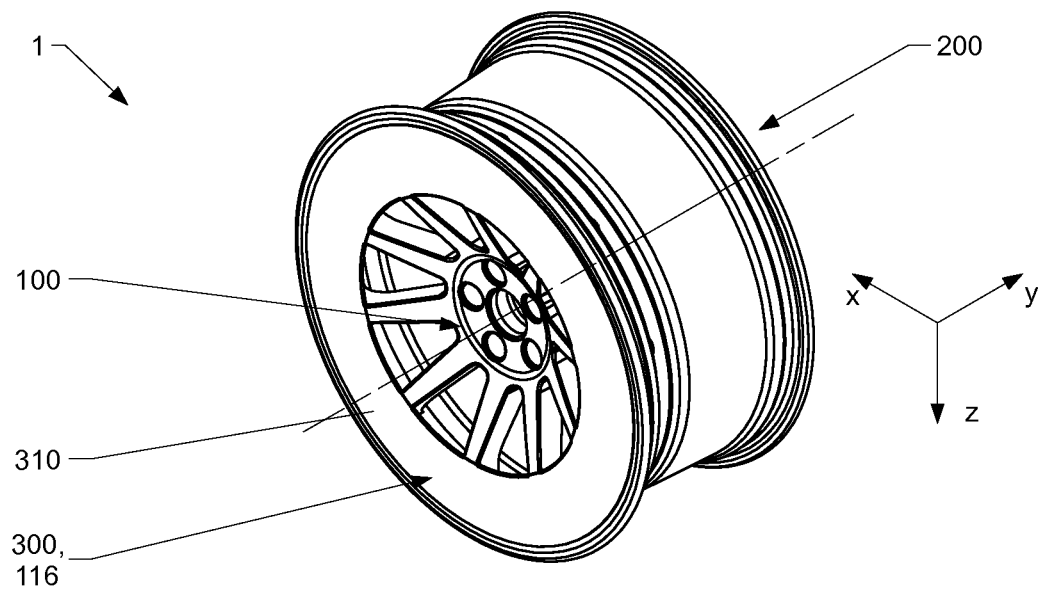
FIG. 7 a further variation of a wheel according to the present disclosure in a perspective view from above.
Figure 8:
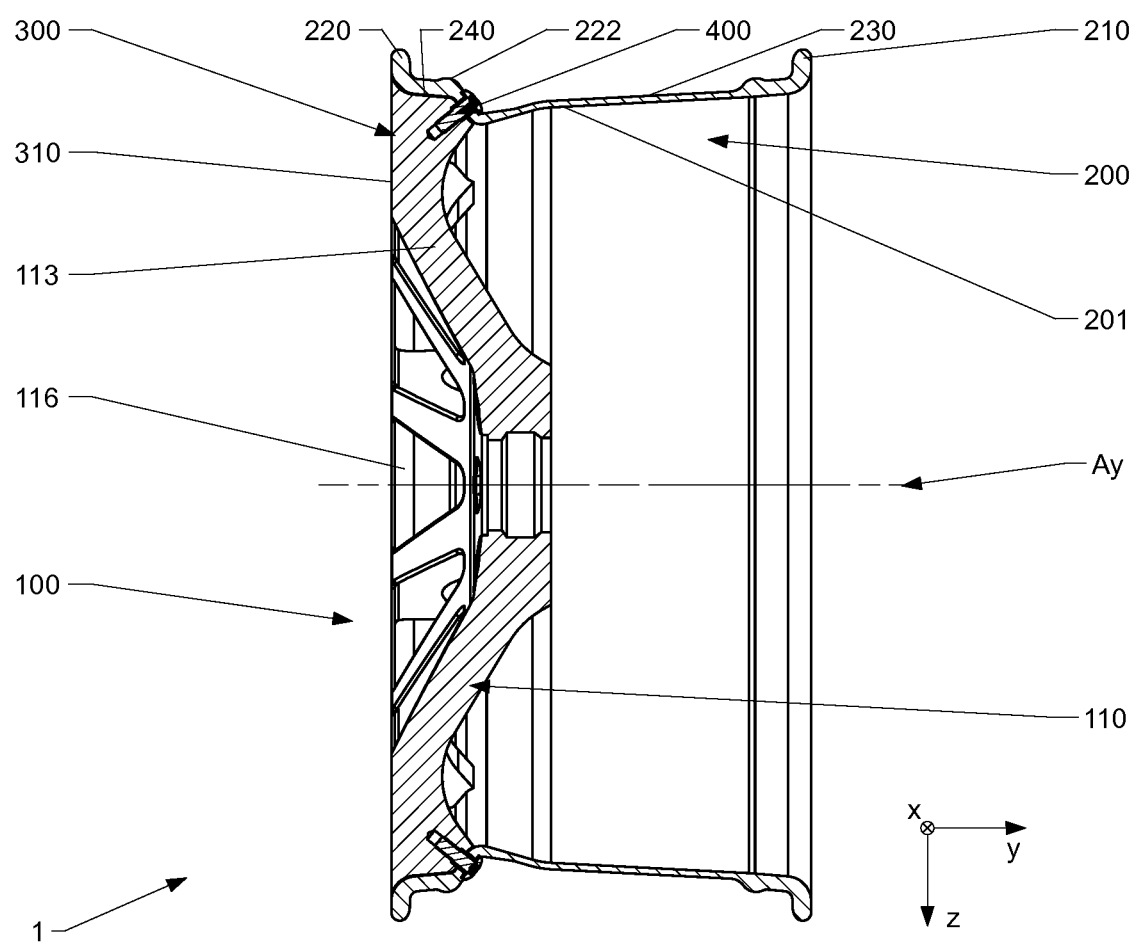
FIG. 8 a cross-section of the wheel of FIG. 7.

FIGS. 7 and 8 depict another variation of a hybrid-type wheel 1 according to the present disclosure, which has a wheel center 100 with spokes 110 made from aluminum. It is clear that such a variation of a wheel is not limited to aluminum and hence other metals may be used as described herein. The wheel 1 comprises circumferential ring 116 that interconnects the centrifugal ends 113 of the spokes 110 with each other. The circumferential ring 116 is mechanically interconnected with a connecting face 240 arranged at the centripetal side 201 of the rim 200. In this variation of a wheel 1 according to the disclosure, the circumferential ring 116 forms a first part of the circumferential collar 300 and merges into the outboard flange 220, which forms a second part of the circumferential collar 300. As also shown, the variation of a wheel 1 comprises screw-type fastening means 400 that extend from the spokes 110 through the rim 200 at the region between the outer hump 222 and the rim well 230.

FIGS. 9 to 11 show a further variation of a wheel 1 according to the present disclosure, being again a hybrid-type of wheel 1. This variation of a wheel also comprises a circumferential cavity 250. However, the circumferential collar 300 and the rim 200 are not a one-part structure (respectively not integrally made). Instead, a cover means 350 extends from the outboard flange 220 towards the axis of rotation Ay and thereby constitutes part of the outboard collar face 310, respectively part of the circumferential collar 300. Thus, the cover 350 means constitutes part of the aerodynamic surface. As can be seen in FIGS. 10 and 11, the fastening means 400 are covered by the cover means 350, improving the aerodynamic properties of the wheel and its visual appearance. As well, corrosion phenomena due to intrusion of humidity into the interstitial space between the fastening means 400 and the rim 200 and wheel center 100 can be prevented. This is highly advantageous for wheels 1 comprising carbon fibers and aluminum parts, as these types of wheels 1 are prone to corrosion phenomena. As well, the cover means 350 is made from a mechanically competent fiber reinforced plastic as well as it is mechanically interconnected with the outboard flange 220 as well as the centripetal part of the rim 200 that is adjacent to the spoke 100 by means of an adhesive film (not shown). Thus, the cover means can transfer load from the rim 200 to the wheel center 100, which increases the mechanical competence of the wheel 1 significantly.

Figure 12:
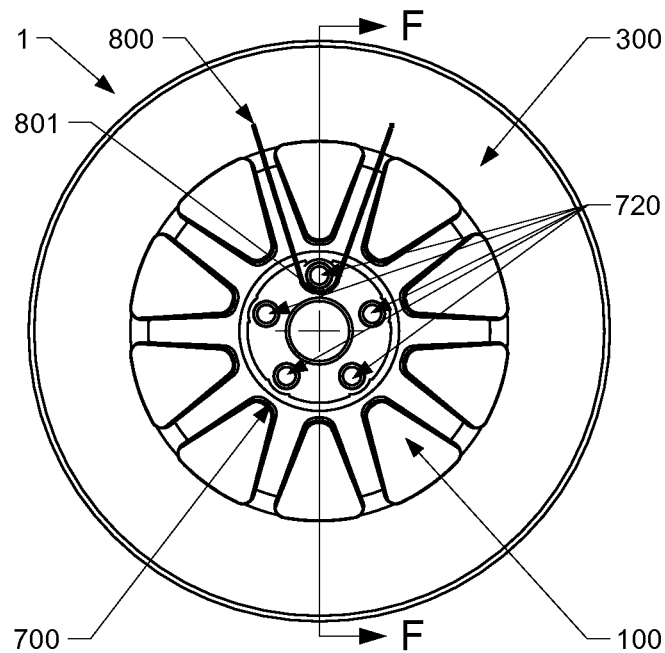
FIG. 12 a front view of a further variation of a wheel according to the present disclosure.
Figure 13:
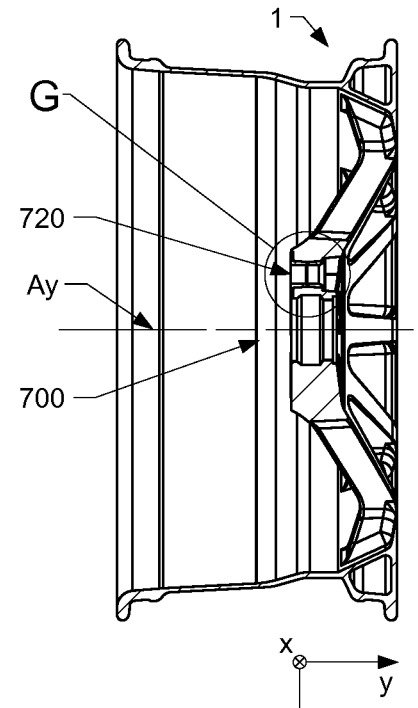
FIG. 13 cross-section FF of FIG. 12.
Figure 14:
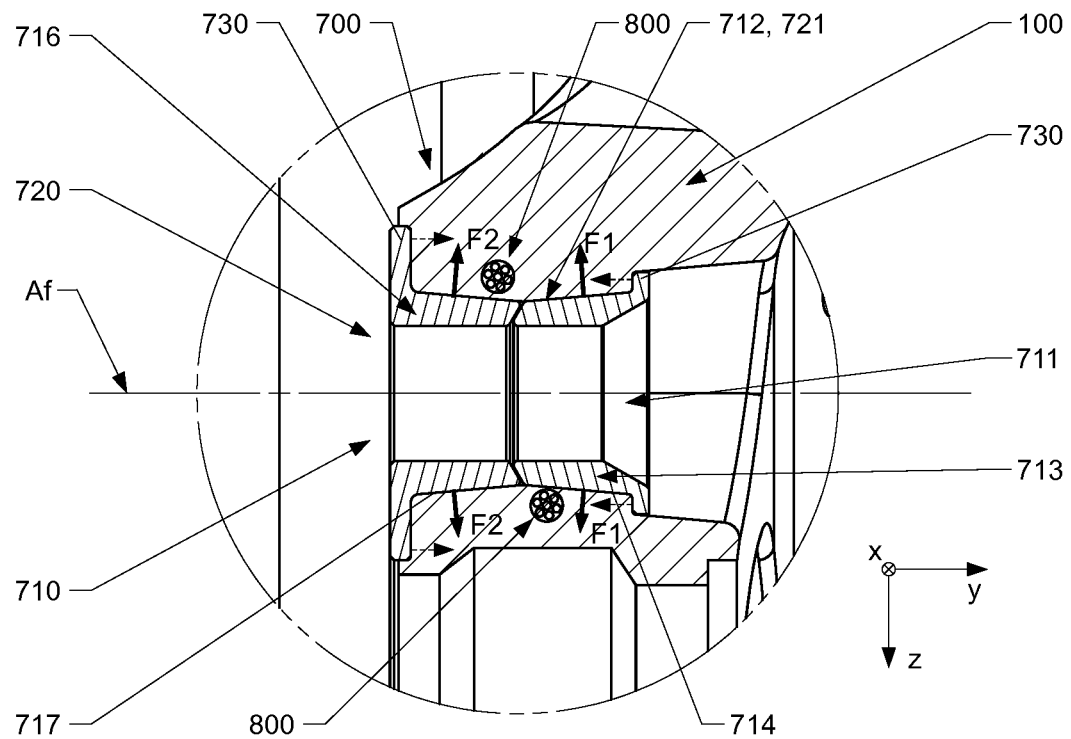
FIG. 14 detail G of FIG. 13.
Figure 15:
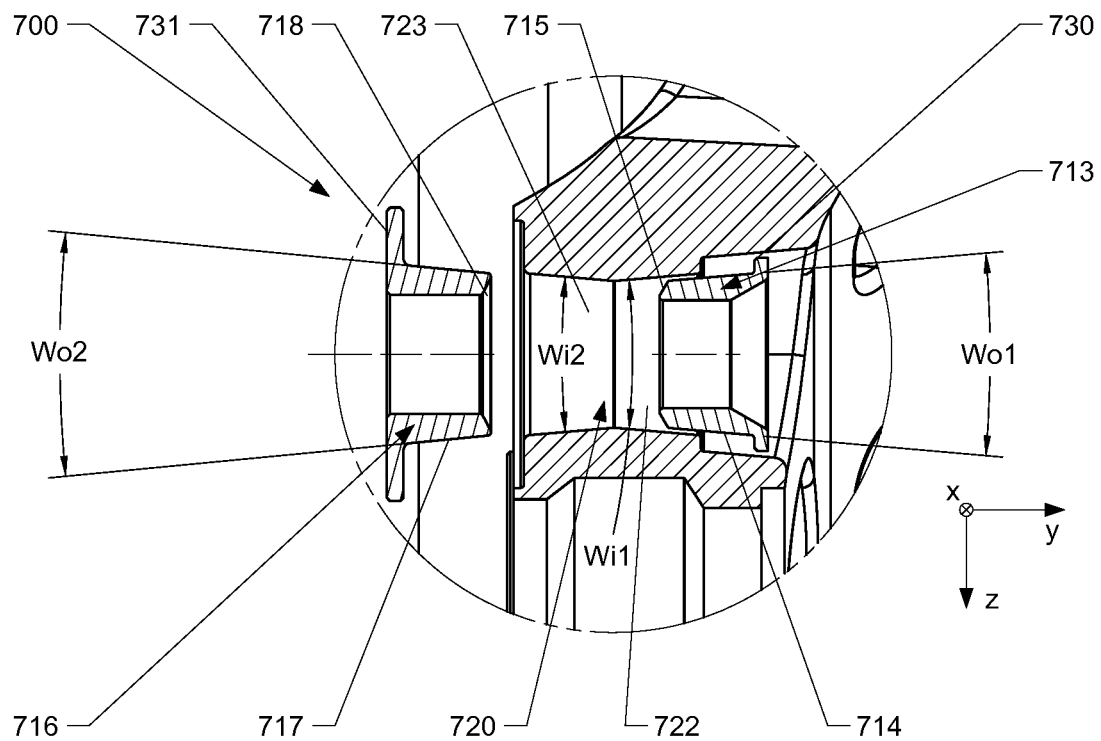
FIG. 15 detail G of FIG. 13, the bushing arrangement partially disassembled.

FIGS. 12 to 15 show a variation of a wheel 1 according to the present invention that has a highly advantageous fastening arrangement 700. The wheel center 100 is partially made from a fiber-reinforced plastic and intended to be interconnected with a vehicle hub (not shown) by means of five wheel bolts/screws or similar elongate fastener means (not shown). The wheel center therefore comprises five fastening apertures 720 that have at least one inner engagement surface 721 and a fastening axis Af. It is clear that the present disclosure is not limited to a certain number of fastening apertures. In order to provide a concise description of the disclosure, it will be described subsequently with respect to one of the five fastening apertures 720 only. The variation of the fastening arrangement 700 shown further comprises, a bushing arrangement 710 having a first and a second bushing 713, 716, the first and the second bushing 713, 716 being configured to be inserted into the fastening aperture 720 from different sides (outboard and inboard side of the wheel center) respectively. The bushing arrangement 710 further comprises an inner bushing opening 711 through which a wheel bolt (not shown) can be inserted for fastening of the wheel 1. The bushing arrangement 710 is further configured to extend along the fastening axis Af into the fastening aperture 720 for fastening of the wheel 1. The bushing arrangement 710 further has an outer engagement surface 712 which comprises a first outer engagement surface 714 arranged at the first bushing 713 and configured to apply a first expanding force F1 on a first inner engagement portion 722 of the fastening aperture 720. The bushing arrangement 710 further comprises a second outer engagement surface 717 arranged at the second bushing 716 and which is configured to apply a second expanding force F2 on a second inner engagement surface 723 of the fastening aperture 720 when the bushing arrangement 710 is inserted into the fastening aperture 720. Thereby a portion of the fastening aperture 720 can be widened by means of the applied forces F1, F2, which leads to a tensioning of a bundle of fibers 800, which forms a loop 801 about the fastening aperture 720. The bundle of fibers 800 extends in centrifugal direction of the wheel 1 towards the rim 200 of the wheel 1 whereby the first and the second end portions 802, 803 of the bundle of fibers 800 extend in different spokes 110 of the wheel and via a circumferential collar 300, as illustrated in FIG. 12. As depicted in FIG. 14, the bushing arrangement 710 comprises a first and a second bushing flange 730, 731 which in a mounted state are configured such that they restrict transversal expansion (Af-direction—illustrated by means of the dotted arrows) of the wheel center 200 about the fastening aperture 720 when the fastening aperture 720 is widened. As shown in FIG. 15, the first outer engagement surface 714 of the first bushing 713 has a frusto-conical shape, which has a first outer opening angle Wo1 of about 15°. The first inner engagement surface 722 of the fastening aperture 720 has a frusto-conical shape with a first inner opening angle Wi1 that is essentially equal to the first outer opening angle Wo1. As well, the second outer engagement surface 717 of the second bushing 716 has also a frusto-conical shape with a second outer opening angle Wo2 that is about 15°. The second inner engagement surface 723 of the fastening aperture 720 also has a frusto-conical shape with a second inner opening angle Wi2 that is essentially equal to the second outer opening angle Wo2. As well, the first bushing 713 comprises a first front face 715 that has a convex shape and the second bushing 716 comprises a second front face 718 that has a concave shape which is configured to receive the first front face 715 in a mounted state. Thus, the first and the second bushing 713, 716 can be reliably aligned relatively to each other.

Figure 16:
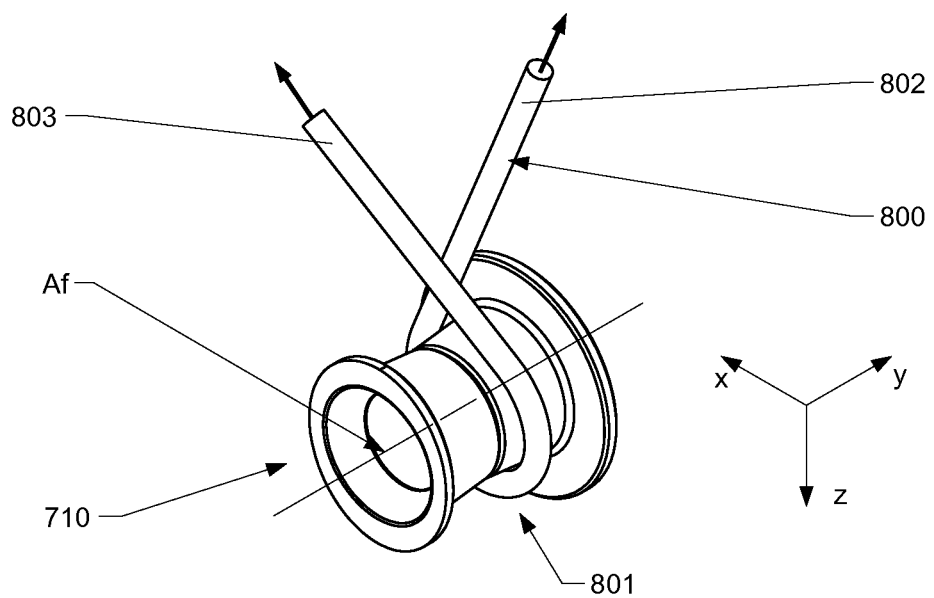
FIG. 16 a first variation of a bundle of reinforcing fibers forming a loop around a bushing arrangement.
Figure 17:
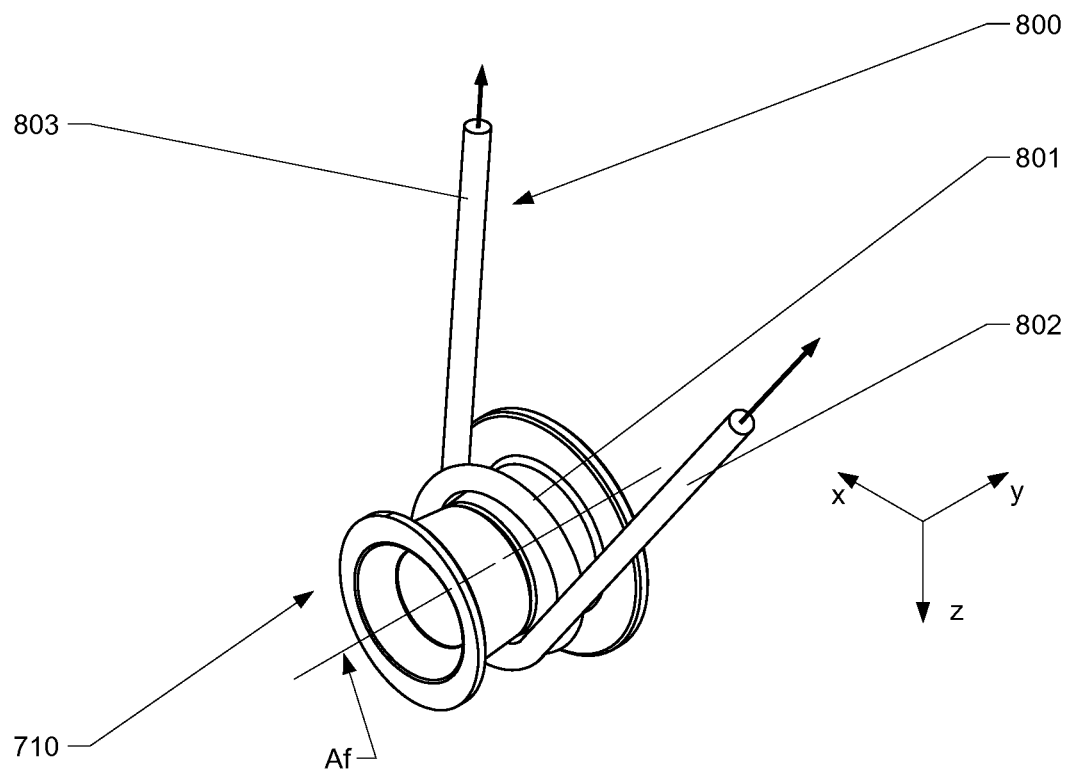
FIG. 17 a second variation of a bundle of reinforcing fibers forming a loop around a bushing arrangement.
Figure 18:
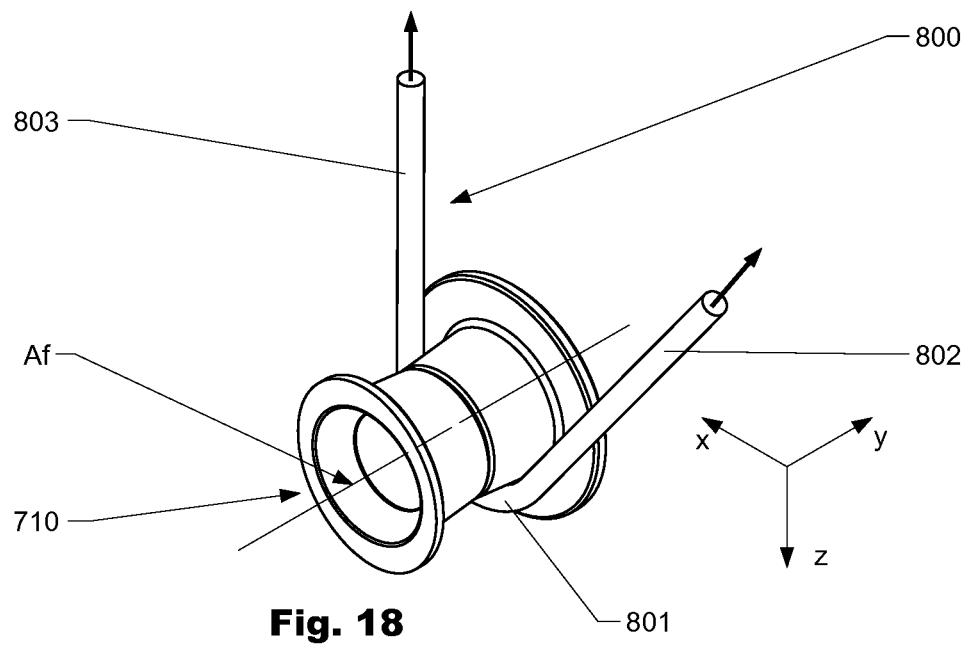
FIG. 18 a third variation of a bundle of reinforcing fibers forming a loop around a bushing arrangement.

FIGS. 16 to 18 schematically show different types of loops 801 formed by bundles of fibers 800 as could be used for a fastening arrangement 700 according to the present disclosure. As shown in FIG. 16, the bundle of fibers 800 may surround the bushing arrangement 710 by slightly more than 360°. As depicted in FIG. 17, the bundle of fibers 800 may also be wound multiple times around the bushing arrangement, or less than 360°, as shown in FIG. 18.

The words used in the specification are words of description rather than limitation, and it is understood that various changes may be made without departing from the spirit and scope of the invention.

The invention claimed is:

1. A wheel comprising:
   a. a rim that is at least partially made from several layers of fiber-reinforced plastic, and
   b. a wheel center comprising multiple spokes extending from a wheel hub, which constitutes an axis of rotation, to the rim in a radial direction, and wherein the rim comprises a rim well extending in transversal direction between an inboard flange and an outboard flange suitable to receive a tire to be mounted thereon, and wherein
   c. the wheel comprises a circumferential collar that extends from the outboard flange radially inwards towards the axis of rotation and that has an outboard collar face that constitutes an aerodynamic surface, wherein the circumferential collar extends axially outward from centrifugal ends of the spokes, wherein the circumferential collar is annulus-shaped having an inner radius and an outer radius, and wherein the minimum distance from the axis of rotation of the wheel to the centripetal side of the rim well is greater than the inner radius.

2. The wheel according to claim 1, wherein the minimum distance from the axis of rotation of the wheel to the centripetal side of the outboard rim shoulder is greater than the inner radius.

3. The wheel according to claim 1, wherein the ratio between the outer radius and the inner radius is between 1.2 and 1.8.

4. The wheel according to claim 1, wherein the outboard collar face of the circumferential collar is flat.

5. The wheel according to claim 1, wherein at least part of the circumferential collar is an integral part of the rim.

6. The wheel according to claim 1, wherein the circumferential collar comprises at least one layer of a fiber-reinforced plastic.

7. The wheel according to claim 6, wherein in a sectional view of the wheel a first layer of reinforcing fibers emerges from the centrifugal side of the rim and extends via the outboard flange into the circumferential collar.

8. The wheel according to claim 7, wherein the first layer of reinforcing fibers starts at the outboard rim shoulder and extends via the outboard flange into the circumferential collar.

9. The wheel according to claim 7, wherein the first layer of reinforcing fibers starts at the rim well and extends via an outboard rim shoulder and via the outboard flange into the circumferential collar.

10. The wheel according to claim 1, wherein the wheel center is at least partially made from several layers of a fiber-reinforced plastic.

11. The wheel according to claim 10, wherein the rim and the wheel center are formed as a one-piece structure.

12. The wheel according to claim 1, wherein the wheel center is at least partially made from a metal.

13. The wheel according to claim 12, wherein the spokes are at least partially made from a metal, and wherein the spokes comprise spoke cavities that extend in the radial direction from the wheel hub to the rim.

14. The wheel according to claim 12, wherein the wheel center comprises a circumferential ring that interconnects the centrifugal ends of the spokes and is mechanically interconnected with a connecting face arranged at the centripetal side of the rim.

15. The wheel according to claim 14, wherein the circumferential ring forms at least part of the circumferential collar.

16. The wheel according to claim 12, wherein the wheel center and the rim are mechanically interconnected by at least one fastening means.

17. The wheel according to claim 16, wherein at least one fastening means extends from a spoke to the circumferential collar.

18. The wheel according to claim 16, wherein the fastening means comprises a screw having a longitudinal axis that is perpendicular to the outboard collar face.

19. The wheel according to claim 12, wherein a cover means extends from the outboard flange towards the axis of rotation forming at least part of the outboard collar face of the circumferential collar.

20. The wheel according to claim 1, wherein the wheel comprises a circumferential cavity arranged adjacent to the circumferential collar.

21. The wheel according to claim 20, wherein the circumferential collar constitutes a wall of the circumferential cavity.

22. The wheel according to claim 20, wherein the circumferential cavity is hollow.

23. A wheel comprising:
   a. a rim that is at least partially made from several layers of fiber-reinforced plastic, and
   b. a wheel center comprising multiple spokes extending from a wheel hub, which constitutes an axis of rotation, to the rim in a radial direction, and wherein the rim comprises a rim well extending in transversal direction between an inboard flange and an outboard flange suitable to receive a tire to be mounted thereon, and wherein
   c. the wheel comprises a circumferential collar that extends from the outboard flange radially inwards towards the axis of rotation and that has an outboard collar face that constitutes an aerodynamic surface, wherein the circumferential collar is annulus-shaped having an inner radius and an outer radius, and the circumferential collar covers centrifugal ends of the multiple spokes.

* * * * *